(12) United States Patent
Iwata et al.

(10) Patent No.: US 12,157,112 B2
(45) Date of Patent: Dec. 3, 2024

(54) ALLOY NANOPARTICLES LOADED NETWORK STRUCTURE AND METHOD FOR PRODUCING ALLOY NANOPARTICLES LOADED POROUS BODY

(71) Applicant: Nippon Telegraph and Telephone Corporation, Tokyo (JP)

(72) Inventors: Mikayo Iwata, Musashino (JP); Masaya Nohara, Musashino (JP); Hiroaki Taguchi, Musashino (JP); Takeshi Komatsu, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 229 days.

(21) Appl. No.: 17/608,405

(22) PCT Filed: May 24, 2019

(86) PCT No.: PCT/JP2019/020640
§ 371 (c)(1),
(2) Date: Nov. 2, 2021

(87) PCT Pub. No.: WO2020/240611
PCT Pub. Date: Dec. 3, 2020

(65) Prior Publication Data
US 2022/0305468 A1    Sep. 29, 2022

(51) Int. Cl.
*B01J 35/23*    (2024.01)
*B01J 21/18*    (2006.01)
(Continued)

(52) U.S. Cl.
CPC .......... *B01J 23/8898* (2013.01); *B01J 21/18* (2013.01); *B01J 35/23* (2024.01); *B01J 35/58* (2024.01);
(Continued)

(58) Field of Classification Search
CPC ........ B01J 23/8898; B01J 35/23; B01J 35/58; B01J 21/18; B01J 37/0236; B01J 37/036;
(Continued)

(56) References Cited

U.S. PATENT DOCUMENTS

| | | | |
|---|---|---|---|
| 2006/0057355 A1* | 3/2006 | Suzuki | C01B 37/00 428/408 |
| 2011/0275011 A1 | 11/2011 | Zhu et al. | |
| 2021/0163293 A1 | 6/2021 | Nohara et al. | |

FOREIGN PATENT DOCUMENTS

| | | |
|---|---|---|
| CN | 109097978 A | 12/2018 |
| JP | 2012-507120 A | 3/2012 |

(Continued)

OTHER PUBLICATIONS

Wang et al ("Biomineralization-Inspired Synthesis of Copper Sulfide-Ferritin Nanocages as CancerTheranostics", ACSNano2016, 10, 3453-3460). (Year: 2016).*

(Continued)

*Primary Examiner* — Robert S Jones, Jr.
*Assistant Examiner* — Jiangtian Xu
(74) *Attorney, Agent, or Firm* — Workman Nydegger

(57) ABSTRACT

A protein template is added to a solution in which metal ions of iron and copper are dissolved to introduce the metal ions into the protein template; the protein template is separated from metal ions that have not been incorporated in the protein template; the metal ions that have been incorporated in the protein template are reduced to obtain a protein containing alloy nanoparticles of iron and copper; a sol or gel in which a co-continuous body is dispersed is frozen; the frozen sol or gel is dried in a vacuum to obtain a porous body; the porous body is allowed to support the alloy nanoparticle containing protein; and the protein is removed.

5 Claims, 7 Drawing Sheets

(51) Int. Cl.
| | |
|---|---|
| *B01J 23/889* | (2006.01) |
| *B01J 35/58* | (2024.01) |
| *B01J 37/02* | (2006.01) |
| *B01J 37/03* | (2006.01) |
| *B01J 37/04* | (2006.01) |
| *B01J 37/08* | (2006.01) |
| *B01J 37/36* | (2006.01) |
| *H01M 4/88* | (2006.01) |
| *B82Y 30/00* | (2011.01) |
| *B82Y 40/00* | (2011.01) |

(52) U.S. Cl.
CPC ......... *B01J 37/0236* (2013.01); *B01J 37/036* (2013.01); *B01J 37/04* (2013.01); *B01J 37/084* (2013.01); *B01J 37/36* (2013.01); *H01M 4/8803* (2013.01); *B82Y 30/00* (2013.01); *B82Y 40/00* (2013.01)

(58) Field of Classification Search
CPC .......... B01J 37/04; B01J 37/084; B01J 37/36; H01M 4/8803; B82Y 30/00; B82Y 40/00
See application file for complete search history.

(56) References Cited

FOREIGN PATENT DOCUMENTS

| | | |
|---|---|---|
| WO | 2004/110930 A1 | 12/2004 |
| WO | 2019/026404 A1 | 2/2019 |

OTHER PUBLICATIONS

Long et al ("Cellulose Aerogels: Synthesis, Applications, and Prospects", Polymers 2018, 10(6), 623). (Year: 2018).*

Selim Alayoglu et al., *Ru-Pt Core-Shell Nanoparticles for Preferential Oxidation of Carbon Monoxide in Hydrogen*, Nature Materials, vol. 7, 2008, pp. 333-338.

Kohei Kusada et al., *Solid Solution Alloy Nanoparticles of Immiscible Pd and Ru Elements Neighboring on Rh: Changeover of the Thermodynamic Behavior for Hydrogen Storage and Enhanced CO-Oxidizing Ability*, Journal of the American Chemical Society, vol. 136, 2014, pp. 1864-1871.

Yu Guo et al., *Compatibility and Thermal Decomposition Mechanism of Nitrocellulose/Cr2O3 Nanoparticles Studied Using DSC and TG-FTIR*, RSC Advances, vol. 9, 2019, pp. 3927-3937.

Long Zhang et al., *Porous 3D Graphene-Based Bulk Materials with Exceptional High Surface Area and Excellent Conductivity for Supercapacitors*, Nature, Scientific Reports, 3, Mar. 11, 2013, pp. 1-9.

* cited by examiner

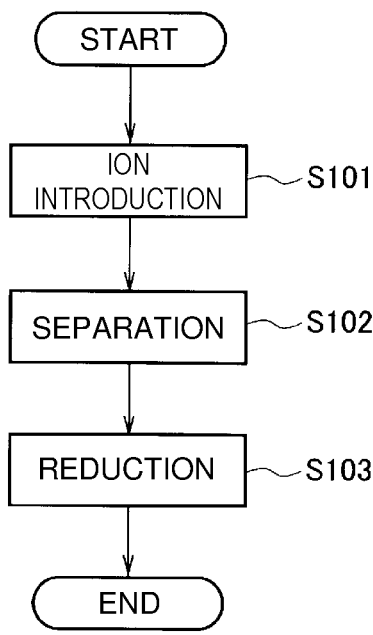
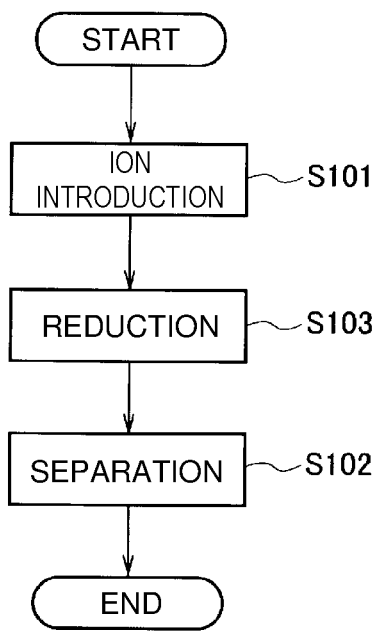

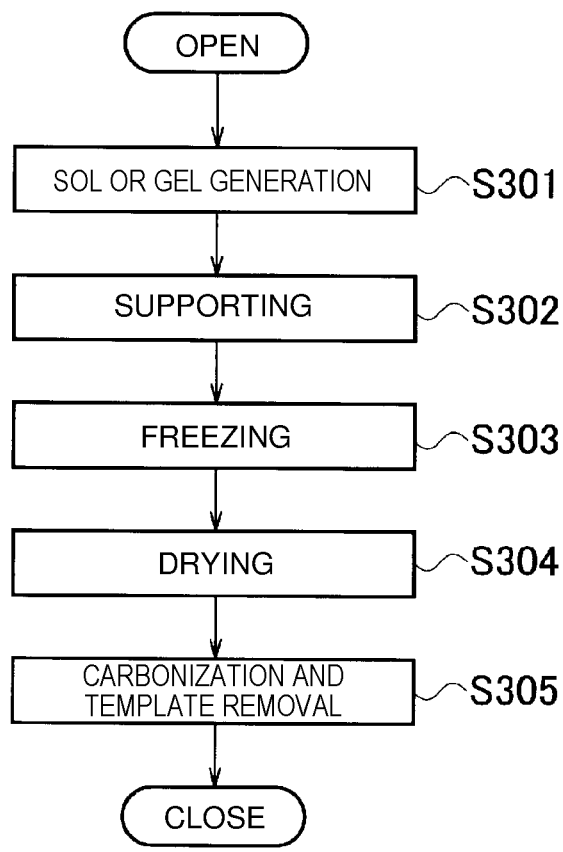

ALLOY NANOPARTICLES LOADED NETWORK STRUCTURE AND METHOD FOR PRODUCING ALLOY NANOPARTICLES LOADED POROUS BODY

TECHNICAL FIELD

The present invention relates to a technology of allowing a mesh structure body to support alloy nanoparticles.

BACKGROUND ART

When metals are formed into nanoparticles, they exhibit unique properties such as a decline in melting point, a change in absorption wavelength, and a higher activity as a catalyst, which has been the subject of extensive studies. For example, in the field of electrochemistry, it has been widely known that, when a carbon electrode is allowed to support nanoparticles of a noble metal such as platinum (Pt), it becomes highly active for the target reaction (Non-Patent Literature 1).

In recent years, studies on alloy nanoparticles have also been supported out. Non-Patent Literature 2 reports that the alloying of ruthenium (Ru) and palladium (Pd) creates alloy nanoparticles with the electronic state of rhodium (Rh), which is the intermediate element between these elements in the periodic table. Ru and Pd have been considered to be easily phase-separated in the bulk state and difficult to be alloyed even in the liquid state at 2000° C. or higher, but the nanosize effect has made it possible to alloy them at the atomic level. This alloy nanoparticle is useful not only in that it exhibits new properties, but also in that its cost can be reduced to about one-third that of Rh. As described above, the importance of alloy nanoparticles has been increasing in the search for new materials.

On the other hand, noble metals such as Pt and Ru used in the nanoparticle mentioned above are expensive, and therefore, there is also a need for a highly active material that does not use noble metals and is composed of inexpensive metals. When a metal other than Pt is used as a catalyst, attempts have been made to improve the activity of the catalyst by making it into nanoparticles or highly dispersed (Non-Patent Literature 3). There are also attempts to increase the specific surface area of a carbon material or metal oxide used as the support for supporting the catalyst (Non-Patent Literature 4).

When the support supporting the catalyst is in the form of powder, it is troublesome to collect the powder after using the support, and thus, efforts are made to keep the shape of the support by mixing a binding agent into it. However, there are problems such as weak physical binding power of the binding agent and swelling caused by water or an organic solvent. With repeated use, the support gradually dissipates and it becomes difficult to keep its shape. Due to the above reasons, it is preferable that the material used for the support be a co-continuous body. Examples of the material that is a co-continuous body include carbon or metal oxides with a porous structure or mesh structure.

CITATION LIST

Non-Patent Literature

Non-Patent Literature 1: S. Alayoglu et al., "Ru—Pt core-shell nanoparticles for preferential oxidation of carbon monoxide in hydrogen", Nature materials, 7, 333-338 (2008)

Non-Patent Literature 2: K. Kusada et al., "Solid Solution Alloy Nanoparticles of Immiscible Pd and Ru Elements Neighboring on Rh: Changeover of the Thermodynamic Behavior for Hydrogen Storage and Enhanced CO-Oxidizing Ability", J. Am. Chem. Soc., 2014, 136, 1864-1871

Non-Patent Literature 3: Y. Guo et al., "Compatibility and thermal decomposition mechanism of nitrocellulose/ Cr2O3 nanoparticles studied using DSC and TG-FTIR", RSC Adv., 2019, 9, 3927-3937

Non-Patent Literature 4: L. Zhang et al., "Porous 3D graphene-based bulk materials with exceptional high surface area and excellent conductivity for supercapacitors", Nature, Scientific Reports, 3, 1408 (2013)

SUMMARY OF THE INVENTION

Technical Problem

However, in the alloying of nanoparticles, in addition to the problem of controlling the particle diameter, there has also been a problem that metals that are easily phase-separated in the bulk state cannot be alloyed because they are separated during particle deposition. For example, the alloying of iron and copper has been said to be difficult because of the phase diagram.

Moreover, when a co-continuous body is used as the support for supporting nanoparticles, there has been a problem that it is difficult to allow the support to uniformly support the nanoparticles even into its inside.

Furthermore, for refinement of the catalyst and highly dispersed supporting, it is necessary to suppress the aggregation of nanoparticles that serve as the catalyst. Aggregation is involved in a complicated manner with the compatibility between the catalyst and the solvent (ease of dispersion) and temperature conditions, thus presenting a problem that it is difficult to suppress the aggregation.

The present invention has been made in view of the above problems, and it is intended to provide a mesh structure body supporting alloy nanoparticles of iron and copper with a uniform particle diameter.

Means for Solving the Problem

An alloy nanoparticle-supporting mesh structure body according to the present invention is characterized by comprising: a mesh structure body having a three dimensional network structure; and alloy nanoparticles of iron and copper supported inside the mesh structure body.

A method for manufacturing an alloy nanoparticle-supporting porous body according to the present invention is characterized by comprising the steps of: freezing a sol or gel in which a co-continuous body is dispersed; drying the frozen sol or gel in a vacuum to obtain a porous body; allowing the porous body to support an alloy nanoparticle-containing protein template; and subjecting the porous body to a heat treatment to remove the protein template.

Effects of the Invention

According to the present invention, a mesh structure body supporting alloy nanoparticles of iron and copper with a uniform particle diameter can be provided.

BRIEF DESCRIPTION OF DRAWINGS

FIG. 1A is a flow chart showing a method for manufacturing an alloy nanoparticle containing protein. FIG. 1B is a flow chart showing a method for manufacturing an alloy nanoparticle containing protein.

FIG. 5 is a flow chart showing a method for manufacturing an alloy nanoparticle-supporting mesh structure body.

DETAILED DESCRIPTION OF THE INVENTION

Figure 2:
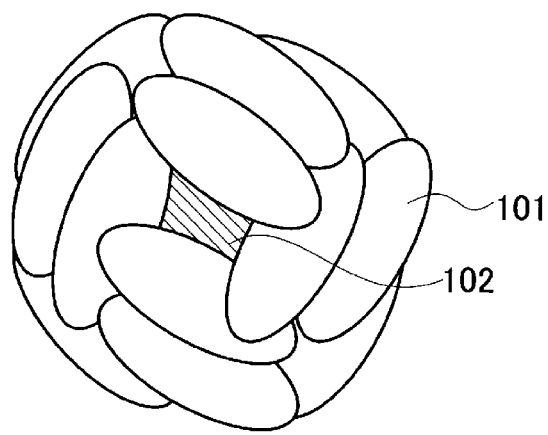
FIG. 2 shows the structure image of a protein.

Hereinafter, embodiments of the present invention will be described with reference to the accompanying drawings.
Method for Manufacturing Alloy Nanoparticle Containing Protein With reference to FIG. 1A and FIG. 1B, methods for manufacturing an alloy nanoparticle containing protein will be described.

The methods for manufacturing an alloy nanoparticle containing protein of the present embodiment comprises an ion introduction step, a separation step, and a reduction step. In the manufacturing method of FIG. 1A and the manufacturing method of FIG. 1B, the order of the separation step and the reduction step is different. In the following, the description will be given in the order of the manufacturing method of FIG. 1A.

In the ion introduction step of step S101, a salt including the metal ions of the target alloy nanoparticles is dissolved in a solvent, and a protein template is added to this solution, thereby introducing the metal ions into the protein template.

Examples of the type of solvent include, for example, an inorganic solvent such as water, hydrochloric acid, aqueous sodium hydroxide solution, aqueous potassium hydroxide solution, aqueous potassium chloride solution, phosphoric acid, phosphate buffer solution, and biochemical buffer solution (PBS, HEPES, tris(hydroxymethyl)aminomethane); and an organic solvent such as glycol, carboxylic acid, methanol, ethanol, propanol, n-butanol, isobutanol, n-butylamine, dodecane, unsaturated fatty acid, ethylene glycol, heptane, hexadecane, isoamyl alcohol, octanol, isopropanol, acetone, and glycerin. The solvent is not limited to the above as long as the protein, which is added later, can maintain its shape as a multimer with a hollow portion including a precursor of the alloy nanoparticle. Also, two or more solvents from the above may be mixed.

As for the type of salt to be dissolved, general salts of water soluble metals that are soluble in the solvent can be used, such as a metal oxide, a metal hydroxide, a metal chloride, a metal sulfate, a metal nitrate, a metal carbonate, and an organometallic salt. At this time, depending on the solvent and the salt to be used, the pH of the solution may be changed, but when the pH becomes high (basic), precipitation of a hydroxide or the like may occur, which is thus not appropriate when different types of metal ions are to be contained. In addition, when the pH of the solution is changed in an extreme manner due to a strong base or strong acid, the protein to be added later may be denatured. This is because the charge state of charged polar groups (glutamic acid, aspartic acid, lysine, arginine, and histidine) on the surface and inside the protein is changed, causing stress between charged particles. Therefore, when the structure of the protein is changed due to pH, it is necessary to adjust the pH by using a solution of strong acid or strong base before adding the protein.

In the present embodiment, the metal ions to be introduced into the protein template are iron ions and copper ions. By using iron ions and copper ions, it is possible to manufacture alloy nanoparticles of iron and copper, which exhibit properties equivalent to those of nickel and cobalt. Note that the combination of metal ions is not limited to iron ions and copper ions.

Examples of the protein template include a ferritin protein, a heat shock protein, a DpsA protein, a capsid protein (a virus selected from the group of adenovirus, rotavirus, poliovirus, HK97 virus, cowpea chlorotic mottle virus (CCMV), cowpea mosaic virus (CPMV), and a modified product thereof), and a modified product obtained by modifying the amino acid sequence thereof. By using these proteins, the coefficient of variation in particle diameter of the alloy nanoparticles that are finally obtained becomes 1 to 15%, providing high uniformity. Depending on the type of protein to be used, the particle size of the alloy nanoparticles can take a value of about 2 to 18 nm.

The protein can form a hollow multimer by gathering several identical proteins, and the alloy nanoparticle can be contained in that hollow portion. As shown in FIG. 2, a protein 101 used in a supporting step forms a hollow multimer by gathering the identical proteins 101, and a precursor 102 of the alloy nanoparticle is incorporated in the hollow portion. In the present embodiment, the precursor 102 is covered with the proteins 101, which prevents the aggregation of the alloy nanoparticles and also allows the creation of alloy nanoparticles with a uniform particle diameter.

In the separation step of step S102, the protein is separated from metal ions that have not been incorporated in the protein, thereby obtaining a dispersion liquid of the protein template containing different types of metal ions. The protein containing different types of metal ions obtained in the ion introduction step is present in a state where it is dispersed in the solution in which metal ions are dissolved. In order to separate the protein with a large molecular weight, dialysis or gel filtration column chromatography is carried out.

In the case of carrying out dialysis, the inside of the dialysis tube is filled with the sample to be separated and immersed in ion exchanged water as the dialysis buffer for 1 to 5 hours, preferably for 1 to 2 hours. After the immersion, the ion exchanged water is changed and dialysis is carried out for another 1 to 2 hours. By changing the ion exchanged water and carrying out dialysis overnight, proteins with large molecular weight remain inside the dialysis tube. As a result, a dispersion liquid of the protein template containing different types of metal ions can be obtained.

Gel filtration column chromatography is a typical technique used for the purification of biomolecules such as proteins and nucleic acids. In the case of using gel filtration column chromatography, the protein can be separated by using a commercially available gel filtration support and column. Molecules with small molecular weights enter pores present on the support in the column and thus take a longer time to pass through the column, whereas molecules with large molecular weights do not enter the pores and thus take a shorter time to pass through the column. The procedure comprises preparation of the running buffer (filtered to remove dust), equilibration of the column (running the buffer through the column), addition of the sample (adding the sample at an amount suited for the column and at a flow rate that does not exceed the limit), and elution of the sample (automatically eluted by running 1.2 CV of buffer with a program). As a result, a dispersion liquid of the protein template containing different types of metal ions can be obtained.

In the reduction step of step S103, the different types of metal ions that have been incorporated in the protein template are reduced with a reducing agent to form alloy nanoparticles. As the reducing agent, sulfur dioxide, hydrogen sulfide, sodium sulfite, oxalic acid, sodium borohydride, potassium iodide, or the like, which is used in general synthetic techniques, can be used. The concentration and amount of the reducing agent is determined depending on the amount and type of the protein template containing different types of metal ions.

By the reduction step, the metal ions that have been incorporated in the protein inner shell are reduced, thereby obtaining an alloy nanoparticle containing protein.

The obtained alloy nanoparticle containing protein is dispersed in a salt free solvent with an approximately neutral pH and used to allow a mesh structure body to support the alloy nanoparticles according to the manufacturing methods 1 to 3, which will be mentioned later.

Note that, as shown in FIG. 1B, metal ions may be introduced into the protein inner shell in the ion introduction step of step S101, the reduction step of step S103 may be then carried out, and after the reduction step, the separation step of step S102 may be carried out.

Manufacturing Method 1 for Alloy Nanoparticle-Supporting Mesh Structure Body

Figure 3:
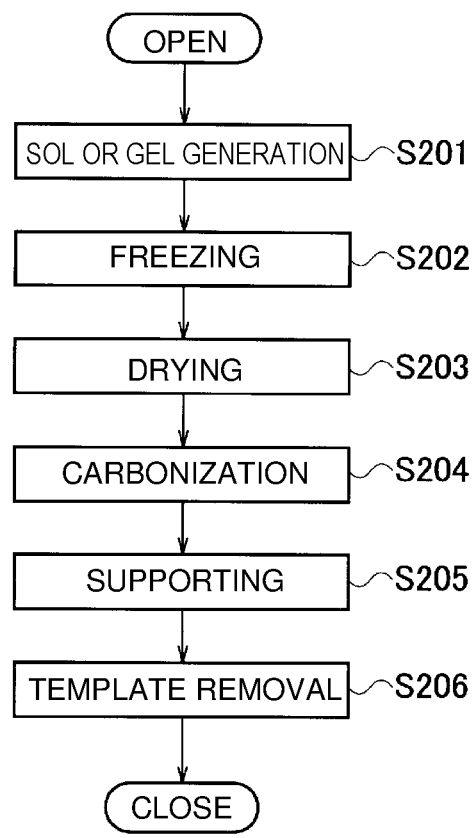
FIG. 3 is a flow chart showing a method for manufacturing an alloy nanoparticle-supporting mesh structure body.

With reference to FIG. 3, a method for manufacturing an alloy nanoparticle-supporting mesh structure body will be described.

The manufacturing method 1 shown in FIG. 3 comprises a sol or gel generation step, a freezing step, a drying step, a carbonization step, a supporting step, and a template removal step.

The sol or gel generation step of step S201 is a step of generating a sol or gel, which is the precursor of a mesh structure body. A sol or gel in which a co-continuous body is dispersed is obtained by adding a dispersion medium to a nanostructure body, which is the dispersoid, and stirring them. The sol means a colloid formed of a dispersion medium and the nanostructure body, which is the dispersoid. Specifically, the sol means a dispersion system having a shear elastic modulus of 1 Pa or less. The gel means a solid dispersion medium having lost fluidity due to the three dimensional network structure of the nanostructure body, which is the dispersoid. Specifically, the gel means a dispersion system having a shear elastic modulus of $10^2$ to $10^6$ Pa.

Examples of the nanostructure body, which is the dispersoid, include a nanosheet, a nanofiber, and a mesh structure body obtained by the hydrothermal synthesis method or sol-gel method (hydrolysis of a metal alkoxide).

The nanosheet is a compound mainly formed of carbon, iron oxide, manganese oxide, zinc oxide, molybdenum oxide, silica, titanium oxide, or alumina, and may be constituted with at least one of the above. The nanosheet is defined as a sheet-like substance having a thickness of 1 nm to 1 μm and having planar longitudinal and lateral lengths that are 100 or more times the thickness. In addition, the nanosheet may be a roll-like sheet or wave-like sheet, may be curved or bent, or may have any shape.

The nanofiber is a compound mainly formed of carbon, iron oxide, manganese oxide, zinc oxide, molybdenum oxide, silica, titanium oxide, alumina, or cellulose, and may be constituted with at least one of the above. The nanofiber is defined as a fibrous substance having a diameter of 1 nm to 1 μm and a length that is 100 or more times the diameter. In addition, the nanofiber may be a hollow fiber or coil-like fiber, or may have any shape.

For the nanosheet and the nanofiber, commercially available products can be used. For example, a nanosheet that can be used is a compound mainly formed of graphene powder (manufactured by Sigma-Aldrich), iron oxide (manufactured by KANTO CHEMICAL CO., INC.), manganese oxide (manufactured by KANTO CHEMICAL CO., INC.), zinc oxide (manufactured by KANTO CHEMICAL CO., INC.), molybdenum oxide (manufactured by KANTO CHEMICAL CO., INC.), silicon oxide (manufactured by KANTO CHEMICAL CO., INC.), copper oxide (manufactured by KANTO CHEMICAL CO., INC.), titanium oxide (manufactured by KANTO CHEMICAL CO., INC.), or aluminum oxide (manufactured by KANTO CHEMICAL CO., INC.), and is constituted with at least one of the above. Also, a nanofiber that can be used is a compound mainly formed of iron oxide (manufactured by KANTO CHEMICAL CO., INC.), manganese oxide (manufactured by KANTO CHEMICAL CO., INC.), zinc oxide (manufactured by KANTO CHEMICAL CO., INC.), molybdenum oxide (manufactured by KANTO CHEMICAL CO., INC.), silicon oxide (manufactured by KANTO CHEMICAL CO., INC.), titanium oxide (manufactured by KANTO CHEMICAL CO., INC.), aluminum oxide (manufactured by KANTO CHEMICAL CO., INC.), or cellulose (NIPPON PAPER INDUSTRIES CO., LTD.), and is constituted with at least one of the above.

By constructing the three dimensional network structure having a large specific surface area with a nanostructure body such as a nanofiber or nanosheet, a mesh structure body is obtained that has excellent stretchability when compressed or extended because the pores play the role of a cushion. Specifically, the mesh structure body desirably has a distortion of 5% or more, and more desirably 10% or more at the elastic limit.

Examples of the dispersion medium of the sol or gel include an aqueous medium such as water ($H_2O$); and an organic medium such as carboxylic acid, methanol ($CH_3OH$), ethanol ($C_2H_5OH$), propanol ($C_3H_7OH$), n-butanol, isobutanol, n-butylamine, dodecane, unsaturated fatty acid, ethylene glycol, heptane, hexadecane, isoamyl alcohol, octanol, isopropanol, acetone, and glycerin. Two or more media from the above may be mixed.

By adjusting the concentration of the gel or sol, the specific surface area of the mesh structure body can be adjusted freely. The specific surface area of the mesh structure body to be obtained is increased as the concentration of the gel or sol is decreased. When the concentration becomes 0.01% by weight or less, however, it becomes difficult for the dispersoid to construct the three dimensional network structure. Therefore, it is suitable that the concentration of the dispersoid should be 0.01 to 10% by weight or less.

Note that, in the sol or gel generation step, the sol or gel may be generated by hydrothermal synthesis or may be generated by the sol-gel method (hydrolysis of a metal alkoxide).

The hydrothermal synthesis is a method of obtaining a sol or gel by placing a water soluble metal dissolved in a solvent in an autoclave and treating it under high temperature and high pressure conditions. By carrying out hydrothermal synthesis, the mesh structure body is synthesized under high pressure, and therefore, a homogeneous metal oxide sol or gel with a uniform particle diameter is obtained.

The water soluble metal refers to a metal oxide, a metal hydroxide, a metal chloride, a metal sulfate, a metal nitrate, a metal carbonate, an organometallic salt, or the like. The metal in the metal salt to be used is preferably at least one metal selected from the group consisting of iron, manganese, zinc, copper, titanium, silicon, and molybdenum. For example, it is iron oxide, iron hydroxide, iron chloride, iron(II) chloride tetrahydrate, iron(II) sulfate heptahydrate, iron(II) sulfate, iron nitrate, iron(II) carbonate, manganese dioxide, manganese hydroxide, manganese chloride, manganese sulfate, manganese nitrate hexahydrate, manganese carbonate, zinc oxide, zinc hydroxide, zinc chloride, zinc sulfate, zinc nitrate hexahydrate, zinc carbonate, copper oxide, copper hydroxide, copper chloride, copper sulfate, copper nitrate, copper carbonate, titanium oxide, tetrahydroxytitanium, titanium tetrachloride hydrate, titanium sulfate, titanium nitrate, titanium tetraisopropoxide, silicon dioxide, tetraethoxysilane, or the like, and two or more from the above may be mixed.

The solvent is not limited to water as long as it is a solvent that can dissolve the water soluble metal salt. Examples of the solvent include, for example, an aqueous solvent such as water, hydrochloric acid, aqueous sodium hydroxide solution, aqueous potassium hydroxide solution, and aqueous potassium chloride solution; and an organic solvent such as glycol, carboxylic acid, methanol, ethanol, propanol, n-butanol, isobutanol, n-butylamine, dodecane, unsaturated fatty acid, ethylene glycol, heptane, hexadecane, isoamyl alcohol, octanol, isopropanol, acetone, and glycerin. Two or more solvents from the above may be mixed. In particular, manufacturing with hydrochloric acid or sodium hydroxide, which is readily available and used in general synthetic techniques, is preferable.

The water soluble metal salt and the solvent are placed in a sealed container such as an autoclave for a hydrothermal treatment. The reaction temperature is 100° C. to 1000° C., and is preferably 100° C. to 800° C. The hydrothermal treatment time is 1 to 500 h, and is preferably 5 to 100 h. At this time, the pressure is 0.10 MPa to 20 MPa, preferably 0.1 MPa to 3 MPa, and the high pressure conditions are achieved by heating the sealed container.

In the sol-gel method, the temperature required for the reaction is as low as room temperature to about 150° C., and the mesh structure body can be conveniently obtained. The metal alkoxide is a substance represented by the chemical formula of M(OR)n, and examples thereof include an organometallic complex such as a metal acetate or acetylacetonate.

The metal to be used is preferably at least one metal selected from the group consisting of iron, manganese, zinc, copper, titanium, silicon, and molybdenum. For example, it is triisopropoxyiron (manufactured by KANAE Co., Ltd.), iron acetylacetonate (manufactured by KANTO CHEMICAL CO., INC.), manganese acetylacetonate (manufactured by Tokyo Chemical Industry Co., Ltd.), zinc acetylacetonate (manufactured by KANTO CHEMICAL CO., INC.), copper acetylacetonate (manufactured by KANTO CHEMICAL CO., INC.), tetraisopropyl orthotitanate (manufactured by KANTO CHEMICAL CO., INC.), titanium acetylacetonate (manufactured by Tokyo Chemical Industry Co., Ltd.), tetraethoxysilane (manufactured by Tokyo Chemical Industry Co., Ltd.), pentaethoxymolybdenum (manufactured by Kojundo Chemical Lab. Co., Ltd.), or the like, and two or more from the above may be mixed.

A solvent is used for the purpose of diluting the metal alkoxide solution. Examples of the solvent include, for example, an inorganic solvent such as hydrochloric acid, aqueous sodium hydroxide solution, aqueous potassium hydroxide solution, and aqueous potassium chloride solution; and an organic solvent such as glycol, carboxylic acid, methanol, ethanol, propanol, n-butanol, isobutanol, n-butylamine, dodecane, unsaturated fatty acid, ethylene glycol, heptane, hexadecane, isoamyl alcohol, octanol, isopropanol, acetone, and glycerin. Two or more solvents from the above may be mixed. After the dilution and before adding water, as a drying control agent for lowering the hydrolysis reaction rate, tetrahydrofuran, formaldehyde, dimethylformamide, oxalic acid, or the like may be used.

After diluting the metal alkoxide with the solvent, water is added and the resultant mixture is hydrolyzed while increasing the temperature, thereby obtaining a sol or gel. At this time, the temperature condition is 15° C. to 200° C., and is preferably 25° C. to 150° C.

The freezing step of S202 is a step of freezing the sol or gel. The freezing step is performed by, for example, accommodating the sol or gel in which the nanostructure body is dispersed in an appropriate container such as a test tube, and cooling the surrounding of the container in a coolant such as liquid nitrogen. The technique of freezing is not particularly limited as long as the dispersion medium of the gel or sol can be cooled to the freezing point or lower, and the gel or sol may also be cooled with a freezer or the like. By freezing the gel or sol, the dispersion medium loses fluidity and the dispersoid is fixed, thereby constructing the three dimensional network structure. When the dispersoid is not fixed by the freezing step, the dispersoid is aggregated along with the evaporation of the dispersion medium in the subsequent drying step, and therefore, a sufficiently large specific surface area cannot be obtained and it becomes difficult to fabricate the mesh structure body having the three dimensional network structure.

The drying step of step S203 is a step of, by drying the frozen body obtained in the freezing step in a vacuum, taking the dispersoid maintaining or constructing the three dimensional network structure out of the dispersion medium. In the drying step, the frozen body obtained in the freezing step is dried in a vacuum, thereby sublimating the frozen dispersion medium from the solid state. For example, the drying step is performed by accommodating the frozen body in an appropriate container such as a flask, and evacuating the inside of the container. Since the frozen body is placed in the vacuum atmosphere, the sublimation point of the dispersion medium is lowered, and this allows even a substance that is not sublimated at ordinary pressure to be sublimated.

The degree of vacuum in the drying step varies depending on the dispersion medium to be used, and is not particularly limited as long as it enables sublimation of the dispersion medium. For example, when water is used as the dispersion medium, the degree of vacuum must be set such that the pressure is 0.06 MPa or less, but the drying time is prolonged because heat is deprived of as latent heat of sublimation. For this reason, it is suitable that the degree of vacuum should be $1.0 \times 10^{-6}$ to $1.0 \times 10^{-2}$ Pa. Furthermore, upon the drying, heat may also be applied by using a heater or the like. In a method for performing drying in the atmosphere, the state of the dispersion medium is changed from solid to liquid, and subsequently from liquid to gaseous, and therefore, the frozen body is once in a liquid state. Therefore, the dispersoid becomes fluidic again in the dispersion medium, thereby demolishing the three dimensional mesh structure of a plurality of nanostructures. As described above, it is difficult for the drying in the atmospheric pressure atmosphere to fabricate a stretchable mesh structure body.

The carbonization step of step S204 is performed in the case where the mesh structure body is a cellulose nanofiber. When the mesh structure body is not a cellulose nanofiber, the carbonization step is not necessary and the manufacturing method can proceed to the supporting step of step S205. In the carbonization of the mesh structure body, the carbonization may be performed by calcining the mesh structure body in an inert gas atmosphere at 200° C. to 2000° C., and more preferably 600° C. to 1800° C. The gas that does not burn the cellulose nanofiber may be an inert gas such as nitrogen gas or argon gas. Alternatively, the gas may be a reducing gas such as hydrogen gas or carbon monoxide gas, or may be carbon dioxide gas.

The cellulose nanofiber thus carbonized has high electrical conductivity, corrosion resistance, and large specific surface area, and hence is suitable as a battery, a capacitor, a fuel cell, a biofuel cell, a microbial battery, a catalyst, a solar cell, a semiconductor manufacturing process, medical equipment, a beauty instrument, a filter, a heat resistant material, a flame resistant material, a heat insulating material, an electrically conductive material, an electromagnetic wave shielding material, an electromagnetic wave noise absorbing material, a heating element, a microwave heating element, a cone paper, a garment, a carpet, a mirror antifogging agent, a sensor, a touch panel, and the like.

The supporting step of step S205 is a step of vacuum impregnating the mesh structure body with the dispersion liquid of the alloy nanoparticle containing protein. The mesh structure body to be used as the support is obtained from the steps up to step S203 or step S204. The alloy nanoparticle containing protein to be used is fabricated by the method for manufacturing an alloy nanoparticle containing protein, mentioned above.

At this time, the protein may be dispersed in an arbitrary solvent. Examples of the solvent include, for example, an aqueous solvent such as water, hydrochloric acid, aqueous sodium hydroxide solution, aqueous potassium hydroxide solution, and aqueous potassium chloride solution; phosphate buffer solution and biochemical buffer solution (PBS, HEPES, tris(hydroxymethyl) aminomethane); an organic solvent such as glycol, carboxylic acid, methanol, ethanol, propanol, n-butanol, isobutanol, n-butylamine, dodecane, unsaturated fatty acid, ethylene glycol, heptane, hexadecane, isoamyl alcohol, octanol, isopropanol, acetone, and glycerin; and the like. The solvent is not limited to the above as long as the protein can maintain its shape as a multimer with a hollow portion including the alloy nanoparticle. Also, two or more solvents from the above may be mixed.

The lower the concentration of the protein dispersing solvent, the higher the dispersion can be expected because aggregation can be prevented. However, for improved functions as a functional material, the concentration is preferably high to the extent that the particles are not aggregated. Specifically, the weight ratio of the protein template to the mesh structure body is a weight ratio of 5% to 80%, preferably 10% to 30%.

The template removal step of step S206 is a step of subjecting the protein template to a heat treatment, thereby removing the protein template from the mesh structure body. By removing the protein template from the mesh structure body, the mesh structure body supporting the alloy nanoparticles is obtained. The protein template is removed by calcining it at 100° C. to 2000° C., and more preferably 100° C. to 800° C. When the mesh structure body is carbon derived from cellulose nanofibers, it is removed by carbonizing the template under an inert gas atmosphere. The inert gas may be, for example, ammonia gas, nitrogen oxide gas, nitrogen gas, argon gas, or the like. Alternatively, the gas may be a reducing gas such as hydrogen gas or carbon monoxide gas, or may be carbon dioxide gas. When the mesh structure body is other than carbon, the removal may be performed under an oxygen atmosphere or air atmosphere, in which case the template may be removed by burning it.

Manufacturing Method 2 for Alloy Nanoparticle-Supporting Mesh Structure Body

Figure 4:
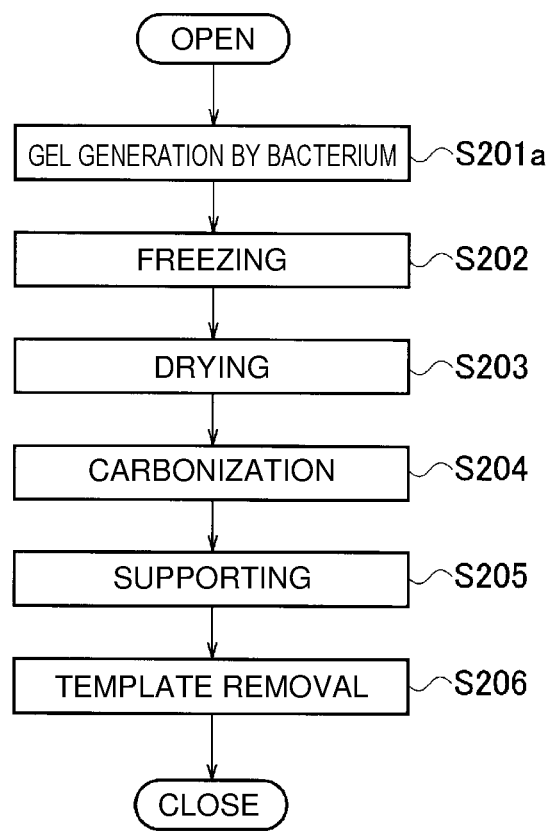
FIG. 4 is a flow chart showing a method for manufacturing an alloy nanoparticle-supporting mesh structure body.

With reference to FIG. 4, another method for manufacturing an alloy nanoparticle-supporting mesh structure body will be described.

The manufacturing method 2 shown in FIG. 4 comprises a gel generation step, a freezing step, a drying step, a carbonization step, a supporting step, and a template removal step.

The manufacturing method 2 differs from the manufacturing method 1 in the gel generation step. In the gel generation step, the manufacturing method 2 generates a gel with a bacterium. By using this manufacturing method, the synthesis of a mesh structure body formed of nanofibers on the order of nm is enabled, and a mesh structure body with a large specific surface area can be obtained.

The gel generation step of step S201a is a step of allowing a predetermined bacterium to generate a gel in which nanofibers made of any of iron oxide, manganese oxide and cellulose are dispersed. The gel produced by a bacterium has a nm-order fiber as a basic structure. By using this gel to fabricate a mesh structure body, the mesh structure body to be obtained will have a large specific surface area. Specifically, by using the gel produced by a bacterium, a mesh structure body having a specific surface area of 300 m$^2$/g or more can be synthesized. It is desirable that the mesh structure body as a functional material should have a large specific surface area, and therefore, it is suitable to use the gel produced by a bacterium.

In addition, the gel produced by a bacterium has a structure in which fibers get entangled into the form of a coil or mesh, and further has a structure in which nanofibers branch based on the proliferation of the bacterium, and therefore, in the mesh structure body to be obtained, excellent stretchability with a distortion of 50% or more at the elastic limit is accomplished.

As the gel produced by a bacterium, two or more among bacterial cellulose, iron oxide, and manganese oxide may be mixed.

Examples of the bacterium include those publicly known, and it may be, for example, an *acetobacter* such as *Acetobacter xylinum* subspecies *Sucrofermentans*, *Acetobacter xylinum* ATCC23768, *Acetobacter xylinum* ATCC23769, *Acetobacter pastorianus* ATCC10245, *Acetobacter xylinum* ATCC14851, *Acetobacter xylinum* ATCC11142 and *Acetobacter xylinum* ATCC10821, *Agrobacterium*, *Rhizobium*, *Sarcina*, *Pseudomonas*, *Achromobacter*, *Alcaligenes*, *Aerobacter*, *Azotobacter*, *Zooglea*, *Enterobacter*, *Kluyvera*, *Leptothrix*, *Gallionella*, *Siderocapsa*, *Thiobacillus*, and those generated by culturing various mutant strains created by subjecting the above bacteria to a mutation treatment by a publicly known method using NTG (nitrosoguanidine) or the like.

The freezing step of step S202, the drying step of step S203, the carbonization step of step S204, the supporting step of step S205, and the template removal step of step S206 are the same as those in the manufacturing method 1.

Manufacturing Method 3 for Alloy Nanoparticle-Supporting Mesh Structure Body

With reference to FIG. 5, still another method for manufacturing an alloy nanoparticle-supporting mesh structure body will be described.

The manufacturing method 3 shown in FIG. 5 comprises a sol or gel generation step, a supporting step, a freezing step, a drying step, and a carbonization and template removal step.

The manufacturing method 3 differs from the manufacturing methods 1 and 2 in that a dispersion liquid of protein is added to the sol or gel before freezing and drying the sol or gel to obtain the mesh structure body. In the manufacturing method 3, the carbonization step and the template removal step of the manufacturing methods 1 and 2 can be combined, thus enabling a reduction in the number of steps. In addition, the supporting step is present at a stage prior to the formation of the mesh structure body, which enables the catalyst to be uniformly supported even inside the mesh structure body.

For the sol or gel generation step of step S301, the sol or gel generation step of the manufacturing methods 1 and 2 can be used.

The supporting step of step S302 is a step of adding a dispersion liquid of protein to the sol or gel and making it sufficiently included in the sol or gel. The dispersion liquid of protein to be used is the same as that in the supporting step of the manufacturing methods 1 and 2. The gel generated by a bacterium in the manufacturing method 2 has a high water holding capacity, and therefore, in order to allow it to include a protein containing solution, it is good to impregnate the gel with the solution for 1 hour to 1 week, and more preferably, for 1 day to 3 days. During the impregnation, a shaker, a magnetic stirrer, a homogenizer, a ball mill, a blender, a stirrer, or the like may be used.

In the freezing step of step S303 and the drying step of step S304, the sol or gel supporting the protein template is frozen and dried by vacuum drying, as in the manufacturing methods 1 and 2.

The carbonization and template removal step of step S305 is a step of calcining the protein template, thereby removing the protein template from the mesh structure body, as in the template removal step of the manufacturing methods 1 and 2. When the mesh structure body is derived from cellulose, the heat treatment must be carried out under an atmosphere of a gas that does not burn the mesh structure body, for example, an inert gas such as nitrogen gas or argon gas, or a reducing gas such as hydrogen gas or carbon monoxide gas, or carbon dioxide gas. At this time, the temperature condition is preferably 200° C. to 2000° C., and is more preferably 600° C. to 1000° C. When the mesh structure body is not derived from cellulose, the heating atmosphere is not particularly limited, and the protein template may be removed by burning it under an air atmosphere or oxygen atmosphere. The temperature condition is preferably 100° C. to 2000° C., and is more preferably 100° C. to 1000° C.

Fabrication Example of Protein Containing Alloy Nanoparticles of Iron and Copper Next, Fabrication Example of a protein containing alloy nanoparticles of iron and copper will be described. Here, an example is given in which an alloy nanoparticle containing protein was fabricated according to the manufacturing method of FIG. 1A, using a commercially available apoferritin solution (manufactured by Tokyo Chemical Industry Co., Ltd.) as the protein template and using iron ions and copper ions as the metal ions. By changing apoferritin to a protein template made of another material, the particle diameter of the target alloy nanoparticles can be prepared.

The apoferritin solution is a form of ferritin that does not have ferrihydrite stored in the inner shell of ferritin. In the present Example, an apoferritin solution that was obtained by diluting the commercially available apoferritin solution with a HEPES buffer solution to 10% by weight was used. The commercially available apoferritin solution is taken from the spleen of a horse and contains a protein constituted with elements C, H, O, N, S, and the like. The commercially available apoferritin solution is sold with the concentration adjusted to 100 mg/1 mL.

In the ion introduction step of step S101, 50 mL of water was placed in a 100 mL beaker, ferric chloride powder (manufactured by KANTO CHEMICAL CO., INC.) and copper sulfate pentahydrate powder (manufactured by KANTO CHEMICAL CO., INC.) were added thereto at 10 mmol/L each, and the mixture was stirred for 10 minutes, thereby fabricating a solution in which iron ions and copper ions were dissolved. Since the pH of the solution indicated around 3, 0.2 mol/L sodium hydroxide was added to the solution to adjust the pH to approximately 7. To this, 1 mL of 1 μmol/L apoferritin was added, and the mixture was stirred for 60 minutes.

In the separation step of step S102, Sephadex G-25 (manufactured by GE Healthcare) was used as the column, and gel filtration column chromatography was carried out using ion exchanged water as the buffer. Since apoferritin has a molecular weight of 440,000, in order to separate it from metal ions, gel filtration column chromatography and dialysis taking advantage of the large molecular weight are effective. Even when other proteins are used, they can be separated based on the difference in molecular weight between the metal ions and the proteins. Through the separation step, a dispersion liquid of the protein containing iron ions and copper ions is obtained.

In the reduction step of step S103, to the dispersion liquid of the protein template containing iron ions and copper ions, 150 μL of 0.2 mol/L sodium borohydride was added as the reducing agent, thereby reducing the iron ions and copper ions in the protein template. When the reducing agent was added to the dispersion liquid of the protein template, the color of the solution was changed and the occurrence of the reduction reaction was confirmed even visually. This is because the metal ions were reduced and the different types of metal ions were thus turned into alloy nanoparticles. Through the reduction step, a dispersion liquid of the protein containing alloy nanoparticles is obtained.

Note that, as in the manufacturing method of FIG. 1B, the reduction step described above may be carried out in a state where the metal ions and the protein are present in the solution before the separation step, and the separation step may be carried out after the reduction step. Carrying out the separation step after the reduction step has an effect of separating the salt used as the reducing agent from the protein.

Fabrication Example of Alloy Nanoparticle-Supporting Mesh Structure Body

Next, description will be given for Examples 1 to 5, in which the alloy nanoparticle containing protein fabricated in the above Example of alloy nanoparticle containing protein was used to fabricate alloy nanoparticle-supporting mesh structure bodies according to the manufacturing methods 1 to 3.

Example 1

Example 1 is an example of the manufacturing method 1. Here, as a representative, an example using graphene as a nanosheet is shown. By changing graphene to a nanosheet made of another material, the mesh structure body can be prepared.

In the sol or gel generation step of step S201, commercially available graphene powder (manufactured by Sigma-Aldrich) was placed in a test tube, water was added thereto, and the mixture was stirred with an ultrasonic cleaning machine (manufactured by Emerson Japan, Ltd.) for 1 hour, thereby fabricating a 0.4% by weight graphene sol.

In the freezing step of step S202, the graphene sol was completely frozen by immersing the test tube described above in liquid nitrogen for 30 minutes.

In the drying step of step S203, the frozen graphene sol was taken out into an eggplant shaped flask and dried in a vacuum of 10 Pa or less by using a freeze drying machine (manufactured by TOKYO RIKAKIKAI CO., LTD.). As a result, a mesh structure body having a three dimensional network structure including graphene nanosheets was obtained.

Since the present sample is not cellulose, the carbonization step of step S204 is not necessary and was thus not carried out.

In the supporting step of step S205, the alloy nanoparticle containing protein was diluted with a HEPES buffer solution to 10% by weight, and the obtained mesh structure body was vacuum impregnated with that dispersion liquid.

In the template removal step of step S206, about one day after the supporting step, the template was removed by calcination at 600° C. for 2 hours under a nitrogen atmosphere.

The carbon material (mesh structure body) of Example 1 obtained by the above steps was evaluated by scanning electron microscopy (SEM) observation, energy dispersive X-ray spectroscopy (EDS) measurement, porosity measurement, and BET specific surface area measurement.

Figure 6A:
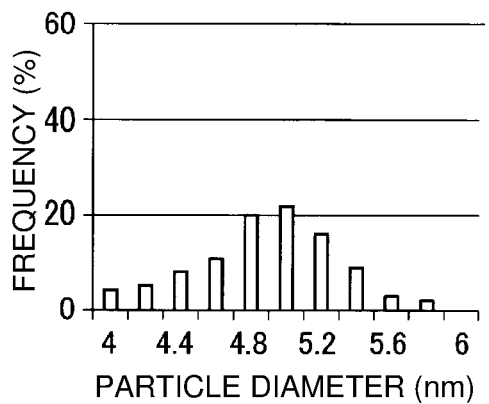
FIG. 6A shows the particle size distribution of Example 1.

The particle size distribution and average particle diameter of the alloy nanoparticles were determined by SEM observation. FIG. 6A is the particle size distribution of Example 1, plotted with the particle diameter on the horizontal axis and the frequency on the vertical axis. The particle size distribution was determined by measuring the particle diameter of 100 points of particles in a 500 nm square (500 nm×500 nm). The particle size distribution of Example 1 is a normal distribution with a peak around 5.0 nm and has a single peak point. Therefore, it can be said that the supporting of nanoparticles with a uniform particle diameter was achieved in Example 1.

The average particle diameter is a value obtained by magnifying the mesh structure body with SEM, measuring the number of particles per 500 nm square and the diameter of the particles, and then determining the average value according to the following formula.

Average particle diameter=Sum of the diameters of all particles/number of particles Table 1 shows the average particle diameters of nanoparticles supported on the mesh structure bodies constituted with nanosheets made of graphene, iron oxide, manganese oxide, zinc oxide, molybdenum oxide, silicon oxide, copper oxide, titanium oxide, and aluminum oxide according to the technique of Example 1.

TABLE 1

|  |  | Mesh structure body | Average particle diameter (nm) |
|---|---|---|---|
| Example 1 | Nanosheet | Graphene nanosheet (C) | 4.9 |
|  |  | Iron oxide ($Fe_2O_3$) | 4.8 |
|  |  | Iron oxide ($Fe_3O_4$) | 4.5 |
|  |  | Manganese oxide ($MnO_2$) | 5.0 |
|  |  | Zinc oxide (ZnO) | 4.7 |
|  |  | Molybdenum oxide ($MoO_3$) | 4.7 |
|  |  | Silicon oxide ($SiO_2$) | 4.9 |
|  |  | Copper oxide (CuO) | 5.0 |
|  |  | Titanium oxide ($TiO_2$) | 5.1 |
|  |  | Aluminum oxide ($Al_2O_3$) | 4.7 |

When the porosity was measured by the mercury press-in method, the porosity was found to be 75% or more. The porosity was calculated from the pore diameter distribution obtained by performing the mercury press-in method on the mesh structure body, modeling pores as a cylindrical shape.

When the BET specific surface area was measured, it was found to be 740 $m^2/g$. The specific surface area is defined to be a specific surface area determined by a BET method using N2 adsorption.

The nanoparticles were measured by EDS and confirmed to be alloyed with about the same amount of iron and copper elements supported.

In addition, evaluation was also carried out on a mesh structure body fabricated by the technique of Example 1 described above, using a carbon nanofiber (manufactured by Sigma-Aldrich) instead of the nanosheets.

The average particle diameter of the alloy nanoparticles was determined by SEM observation, as described above. Table 2 shows the average particle diameters of nanoparticles supported on the mesh structure bodies constituted with the carbon nanofiber, and nanofibers made of iron oxide, manganese oxide, zinc oxide, copper oxide, titanium oxide, silicon oxide, molybdenum oxide, aluminum oxide, and cellulose according to the technique of Example 1.

TABLE 2

|  |  | Mesh structure body | Average particle diameter (nm) |
|---|---|---|---|
| Example 1 | Nanofiber | Carbon nanofiber (C) | 4.6 |
|  |  | Iron oxide ($Fe_2O_3$) | 5.1 |
|  |  | Iron oxide ($Fe_3O_4$) | 4.9 |
|  |  | Manganese oxide ($MnO_2$) | 5.0 |
|  |  | Zinc oxide (ZnO) | 4.9 |
|  |  | Copper oxide (CuO) | 5.0 |
|  |  | Titanium oxide ($TiO_2$) | 5.0 |
|  |  | Silicon oxide ($SiO_2$) | 5.1 |
|  |  | Molybdenum oxide ($MoO_3$) | 4.9 |
|  |  | Aluminum oxide ($Al_2O_3$) | 4.8 |
|  |  | Cellulose nanofiber | 4.8 |

When the BET specific surface area was measured, it was found to be 810 $m^2/g$.

For the carbon material fabricated in Example 1, it is possible to use cellulose derived from natural products, the environmental impact of which is extremely low. Since such a carbon material can be easily disposed of in daily life, it can be effectively utilized in a variety of situations, including a small device, a sensor terminal, medical equipment, a battery, a beauty instrument, a fuel cell, a biofuel cell, a microbial battery, a capacitor, a catalyst, a solar cell, a semiconductor manufacturing process, a filter, a heat resistant material, a flame resistant material, a heat insulating material, an electrically conductive material, an electromagnetic wave shielding material, an electromagnetic wave noise absorbing material, a heating element, a microwave heating element, a cone paper, a garment, a carpet, a mirror antifogging agent, a sensor, a touch panel, and the like.

Comparative Example 1

Comparative Example 1 is a comparative example in which a carbon material was fabricated by normal drying without carrying out the freezing step and the drying step of Example 1.

A 0.4% by weight graphene sol, fabricated in the same manner as in the sol or gel generation step of Example 1, was poured into a petri dish, placed in a thermostatic bath, and subjected to a drying treatment at 60° C. for 12 hours. Thereafter, the mesh structure body was carbonized by calcination at 600° C. for hours under a nitrogen atmosphere, thereby fabricating the carbon material (mesh structure body).

Subsequently, in the same manner as in the supporting step of Example 1, the alloy nanoparticle containing protein was diluted with a HEPES buffer solution to 10% by weight, and the obtained mesh structure body was vacuum impregnated with that dispersion liquid.

Then, in the same manner as in the template removal step of Example 1, about one day after the supporting step, the template was removed by calcination at 600° C. for 2 hours under a nitrogen atmosphere.

The carbon material (mesh structure body) of Comparative Example 1 obtained by the above steps was evaluated by SEM observation, EDS measurement, porosity measurement, and BET specific surface area measurement.

The carbon material of Comparative Example 1 was confirmed to be a densely aggregated carbon material with no pores by SEM observation. Due to the low porosity, the dispersion liquid of protein could not penetrate into the inside, and the particles were confirmed to be deposited only on the surface. In addition, the nanoparticles were measured by EDS and confirmed to be alloyed with about the same amount of iron and copper elements supported.

When the porosity was measured by the mercury press-in method, it was found to be 10% or less. When the BET specific surface area was measured, it was found to be 1 $m^2/g$. As mentioned above, this is thought to be because the carbon material of Comparative Example 1 was a densely aggregated carbon material with no pores.

When Example 1 was compared with Comparative Example 1, it was found that the nanoparticles of Example 1 were supported in a highly dispersed manner compared with those of Comparative Example 1, resulting in a mesh structure body with a uniform particle diameter.

Example 2

Example 2 is an example of the manufacturing method 1 in which the sol or gel was generated by hydrothermal synthesis. Here, as a representative, an example using titanium oxide is shown. By changing the mesh structure body to a nanofiber made of another material, the co-continuous body having a three dimensional network structure can be prepared.

In the sol or gel generation step of step S201, titanium oxide (manufactured by KANTO CHEMICAL CO., INC.) was diluted with 5 mol/L sodium hydroxide to 0.1 mol/L, placed in an autoclave (manufactured by OM Labotech Co., Ltd.), heated at 110° C. for 20 hours, and washed two to three times with 0.1 mol/L hydrochloric acid. Sodium ions in the product were replaced by protons, which destabilized the structure, resulting in titanium oxide fibers.

In the freezing step of step S202, the obtained sol or gel was placed in a test tube, and the sol or gel was completely frozen by immersing this test tube in liquid nitrogen for 30 minutes.

In the drying step of step S203, the frozen sol or gel was dried in a vacuum of 10 Pa or less by using a freeze drying machine (manufactured by TOKYO RIKAKIKAI CO., LTD.). As a result, a dried body of the mesh structure body was obtained.

Since the present sample is not cellulose, the carbonization step of step S204 is not necessary and was thus not carried out.

The supporting step of step S205 and the template removal step of step S206 were carried out in the same manner as in Example 1.

The mesh structure body of Example 2 obtained by the above steps was evaluated by SEM observation, EDS measurement, porosity measurement, and BET specific surface area measurement.

The particle size distribution and average particle diameter of the alloy nanoparticles were determined by SEM observation in the same manner as in Example 1.

Figure 6B:
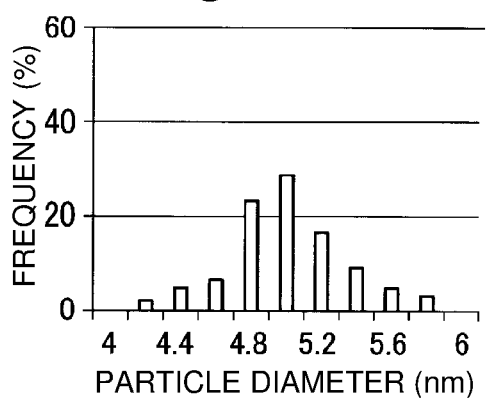
FIG. 6B shows the particle size distribution of Example 2.

FIG. 6B is the particle size distribution of Example 2, plotted with the particle diameter on the horizontal axis and the frequency on the vertical axis. The particle size distribution of Example 2 is a normal distribution with a peak around 5.0 nm and has a single peak point. Therefore, it can be said that the supporting of nanoparticles with a uniform particle diameter was achieved.

Table 3 shows the average particle diameters of nanoparticles supported on the mesh structure bodies constituted with iron oxide, manganese oxide, zinc oxide, copper oxide, titanium oxide, silicon oxide, and molybdenum oxide according to the technique of Example 2.

TABLE 3

|  | Mesh structure body | Average particle diameter (nm) |
|---|---|---|
| Example 2 | Iron oxide ($Fe_2O_3$) | 5.0 |
|  | Iron oxide ($Fe_3O_4$) | 5.1 |
|  | Manganese oxide ($MnO_2$) | 5.2 |
|  | Zinc oxide (ZnO) | 5.0 |
|  | Copper oxide (CuO) | 5.1 |
|  | Titanium oxide ($TiO_2$) | 5.2 |
|  | Silicon oxide ($SiO_2$) | 5.3 |
|  | Molybdenum oxide ($MoO_3$) | 5.2 |

When the porosity was measured by the mercury press-in method, the porosity was found to be 70% or more. When the BET specific surface area was measured, it was found to be 520 $m^2/g$.

The nanoparticles were measured by EDS and confirmed to be alloyed with about the same amount of iron and copper elements supported.

Example 3

Example 3 is an example of the manufacturing method 1 in which the sol or gel was generated by the sol-gel method (hydrolysis of a metal alkoxide). Here, as a representative, an example using titanium oxide is shown. By changing the mesh structure body to a nanofiber made of another material, the co-continuous body having a three dimensional network structure can be prepared.

In the sol or gel generation step of step S201, titanium tetraisopropoxide and propanol as the solvent were added to a container made of polypropylene and stirred with a stirrer, water was added, and the mixture was further stirred. Thereafter, 1 mL of 1 mol/L hydrochloric acid was added to the solution, and the mixture was stirred while heating to 70° C. until gelation occurred.

In the freezing step of step S202, the produced gel was placed in a test tube, and the gel was completely frozen by immersing this test tube in liquid nitrogen for 30 minutes.

In the drying step of step S203, the frozen gel was dried in a vacuum of 10 Pa or less by using a freeze drying machine (manufactured by TOKYO RIKAKIKAI CO., LTD.). As a result, a dried body of the mesh structure body was obtained.

Since the present sample is not cellulose, the carbonization step of step S204 is not necessary and was thus not carried out.

The supporting step of step S205 and the template removal step of step S206 were carried out in the same manner as in Example 1.

The mesh structure body of Example 3 obtained by the above steps was evaluated by SEM observation, EDS measurement, porosity measurement, and BET specific surface area measurement.

The average particle diameter and particle size distribution of the alloy nanoparticles were determined by SEM observation in the same manner as in Example 1.

Figure 6C:
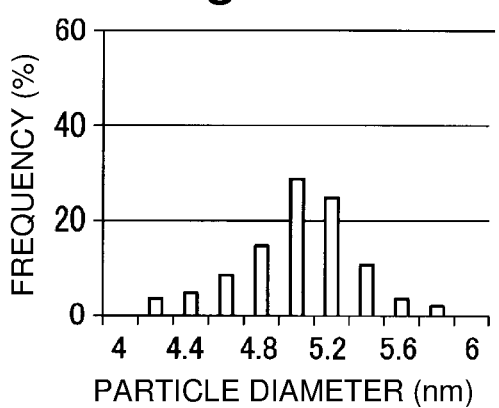
FIG. 6C shows the particle size distribution of Example 3.

FIG. 6C is the particle size distribution of Example 3, plotted with the particle diameter on the horizontal axis and the frequency on the vertical axis. The particle size distribution of Example 3 is a normal distribution with a peak around 5.0 nm and has a single peak point. Therefore, it can be said that the supporting of nanoparticles with a uniform particle diameter was achieved.

Table 4 shows the average particle diameters of nanoparticles supported on the mesh structure bodies constituted with iron oxide, manganese oxide, zinc oxide, copper oxide, titanium oxide, silicon oxide, and molybdenum oxide according to the technique of Example 4.

TABLE 4

| | Mesh structure body | Average particle diameter (nm) |
|---|---|---|
| Example 3 | Iron oxide ($Fe_2O_3$) | 5.2 |
| | Manganese oxide ($MnO_2$) | 5.1 |
| | Zinc oxide (ZnO) | 5.0 |
| | Copper oxide (CuO) | 5.2 |
| | Titanium oxide ($TiO_2$) | 5.1 |
| | Silicon oxide ($SiO_2$) | 5.0 |
| | Molybdenum oxide ($MoO_3$) | 5.2 |

When the porosity of the titania nanotube was measured by the mercury press-in method, the porosity was found to be 70% or more. When the BET specific surface area was measured, it was found to be 590 $m^2/g$.

The nanoparticles were measured by EDS and confirmed to be alloyed with about the same amount of iron and copper elements supported.

Example 4

Example 4 is an example of the manufacturing method 2. Here, as a representative, a case is shown in which a mesh structure body was fabricated from nanofibers made of a cellulose gel produced by *Acetobacter xylinum*, which is an acetic acid bacterium. By changing the used bacterium to an arbitrary bacterium, a mesh structure body formed of nanofibers made of iron oxide or manganese oxide can be prepared.

In the gel generation step of step S201a, a bacterial cellulose gel (manufactured by FUJICCO Co., Ltd.) produced by an acetic acid bacterium, *Acetobacter xylinum*, was used, and this gel was impregnated with ammonia water (10% by weight, manufactured by Wako Pure Chemical Industries, Ltd.) and stirred on a shaker (manufactured by TAITEC CORPORATION) for 48 hours. The obtained gel was washed in pure water for 24 hours by using a shaker. In this washing, pure water was changed three times.

In the freezing step of step S202, the gel in which nanofibers produced by the bacterium were dispersed was placed in a test tube, and the gel was completely frozen by immersing this test tube in liquid nitrogen for 30 minutes.

In the drying step of step S203, the frozen gel was dried in a vacuum of 10 Pa or less by using a freeze drying machine (manufactured by TOKYO RIKAKIKAI CO., LTD.). As a result, a dried body of the mesh structure body was obtained.

In the carbonization step of step S204, the mesh structure body was carbonized by calcination at 600° C. for 2 hours under a nitrogen atmosphere.

The supporting step of step S205 and the template removal step of step S306 were carried out in the same manner as in Example 1.

The mesh structure body of Example 4 obtained by the above steps was evaluated by SEM observation, EDS measurement, porosity measurement, and BET specific surface area measurement.

The particle size distribution and average particle diameter of the alloy nanoparticles were determined by SEM observation in the same manner as in Example 1.

Figure 6D:
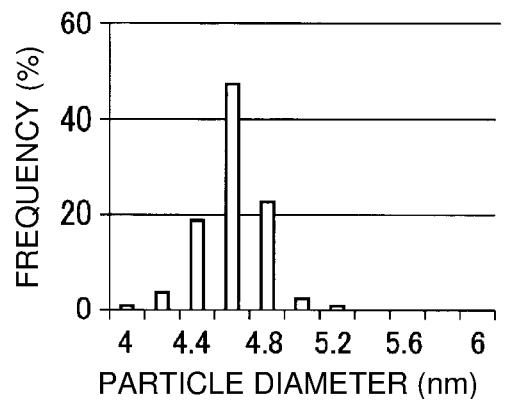
FIG. 6D shows the particle size distribution of Example 4.

FIG. 6D is the particle size distribution of Example 4, plotted with the particle diameter on the horizontal axis and the frequency on the vertical axis. The particle size distribution of Example 4 is a normal distribution with a peak around 4.7 nm and has a narrower peak width compared with Example 1. Therefore, it can be said that, in Example 4, the supporting of nanoparticles with a more uniform particle diameter was achieved compared with Example 1.

Table 5 shows the average particle diameters of nanoparticles supported on the mesh structure bodies constituted with nanofibers made of the bacterium produced carbon, bacterium produced iron oxide, and bacterium produced manganese oxide according to the technique of Example 4.

TABLE 5

| | Mesh structure body | Average particle diameter (nm) |
|---|---|---|
| Example 4 | Bacterium produced carbon (C) | 4.7 |
| | Bacterium produced iron oxide ($Fe_2O_3$) | 4.5 |
| | Bacterium produced manganese oxide ($MnO_2$) | 4.7 |

When the porosity was measured by the mercury press-in method, the porosity was found to be 80% or more. When the BET specific surface area was measured, it was found to be 800 $m^2/g$.

The nanoparticles were measured by EDS and confirmed to be alloyed with about the same amount of iron and copper elements supported.

Example 5

Example 5 is an example of the manufacturing method 3. Here, a bacterium produced gel is used as the sol or gel.

The sol or gel generation step of step S301 was carried out in the same manner as in Example 4 to obtain a bacterium produced gel.

In the supporting step of step S302, the gel in which nanofibers produced by the bacterium were dispersed was placed in a test tube, and the alloy nanoparticle containing protein was diluted with a HEPES buffer solution to 10% by weight and placed in the test tube. Since the gel generated by the bacterium has a high water holding capacity, it was shaken for 3 days using a shaker and impregnated with the dispersion liquid of protein. The volume ratio between the gel and the diluted solution of the protein template is 25 mL and 100 mL, respectively.

The freezing step of step S303 and the drying step of step S304 were carried out in the same manner as in Example 1.

The carbonization and template removal step of step S305 was carried out in the same manner as in the template removal step of Example 1.

The mesh structure body of Example 5 obtained by the above steps was evaluated by SEM observation, EDS measurement, porosity measurement, and BET specific surface area measurement.

The particle size distribution and average particle diameter of the alloy nanoparticles were determined by SEM observation in the same manner as in Example 1.

Figure 6E:
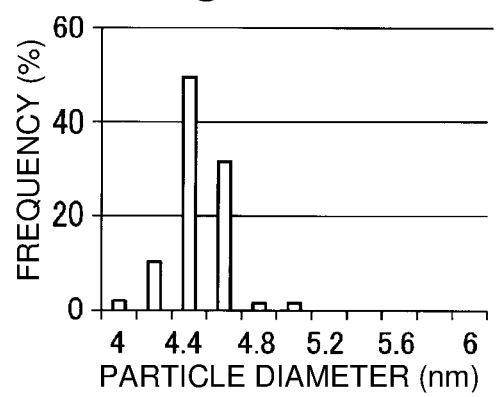
FIG. 6E shows the particle size distribution of Example 5.

FIG. 6E is the particle size distribution of Example 5, plotted with the particle diameter on the horizontal axis and the frequency on the vertical axis. The particle size distribution of Example 5 is a normal distribution with a peak around 4.4 nm and has a narrower peak width compared with the other Examples 1 to 4. Therefore, it can be said that the supporting of nanoparticles with a uniform particle diameter was achieved in Example 5.

Table 6 shows the average particle diameters of nanoparticles supported on the mesh structure bodies constituted with iron oxide, manganese oxide, zinc oxide, copper oxide, titanium oxide, silicon oxide, and molybdenum oxide according to the technique of Example 5.

TABLE 6

| | Mesh structure body | Average particle diameter (nm) |
|---|---|---|
| Example 5 | Graphene nanosheet (C) | 4.4 |
| | Carbon nanofiber (C) | 4.3 |
| | Bacterium produced carbon (C) | 4.4 |
| | Bacterium produced iron oxide ($Fe_2O_3$) | 4.6 |
| | Bacterium produced manganese oxide ($MnO_2$) | 4.3 |
| | Iron oxide ($Fe_2O_3$) | 4.7 |
| | Iron oxide ($Fe_3O_4$) | 4.8 |
| | Manganese oxide ($MnO_2$) | 4.9 |
| | Zinc oxide (ZnO) | 4.6 |
| | Copper oxide (CuO) | 4.8 |
| | Titanium oxide ($TiO_2$) | 5.2 |
| | Silicon oxide ($SiO_2$) | 5.0 |
| | Molybdenum oxide ($MoO_3$) | 5.0 |

When the porosity of the mesh structure body was measured by the mercury press-in method, the porosity was found to be 85% or more. When the BET specific surface area was measured, it was found to be 775 $m^2/g$.

Figure 7A:
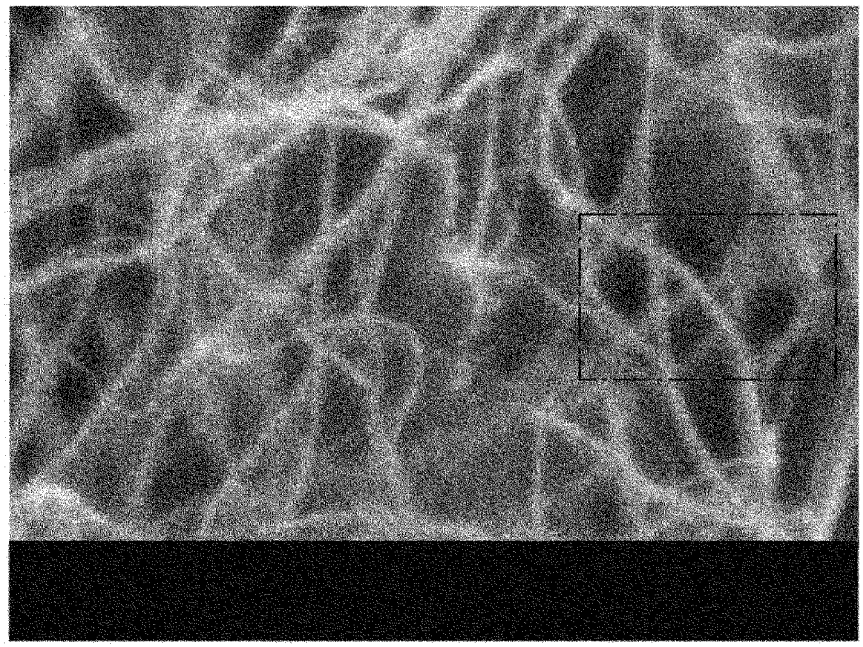
FIG. 7A is a SEM image of the internal portion of the mesh structure body of Example 5.
Figure 7B:
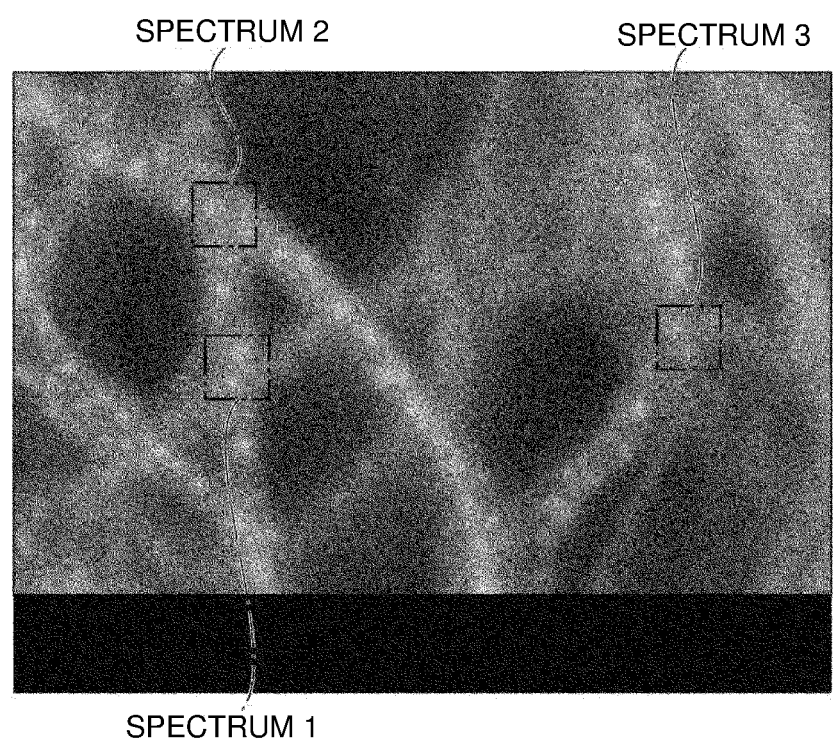
FIG. 7B is a SEM image of the internal portion of the mesh structure body of Example 5.

FIG. 7A and FIG. 7B show SEM images of the internal portion of the mesh structure body of Example 5. FIG. 7B is an enlargement of the frame of FIG. 7A. From FIG. 7A and FIG. 7B, it can be seen that the nanoparticles are supported in a highly dispersed manner not only on the surface of the mesh structure body but also inside thereof.

When the areas shown by the spectra 1 to 3 of FIG. 7B were subjected to elemental analysis by EDS measurement, as shown in the following Table 7, iron and copper were detected to almost the same extent in each area, confirming that iron and copper were alloyed.

TABLE 7

| Spectrum label | Spectrum 1 | Spectrum 2 | Spectrum 3 |
|---|---|---|---|
| C | 95.13 | 94.98 | 96.24 |
| Fe | 2.01 | 2.30 | 1.86 |
| Cu | 2.86 | 2.72 | 1.90 |
| Total | 100 | 100 | 100 |

Comparative Example 2

Comparative Example 2 is a comparative example that does not use a protein for supporting nanoparticles and supports nanoparticles with iron chloride.

The manufacturing method of Comparative Example 2 comprises: a freezing step of freezing a sol or gel-like mesh structure body to obtain a frozen body; a drying step of drying the frozen body in a vacuum to obtain a dried body; and a carbonization step of heating the dried body in a gas atmosphere that does not burn it to carbonize it.

A 0.4% by weight graphene sol solution fabricated in the same manner as in the sol or gel generation step of Example 1 was poured into a beaker, a 0.1 mol/L iron chloride solution in which $FeCl_2$ and $FeCl_3$ were dissolved in water at a weight ratio of 1:2 was added thereto, and 30% ammonia water (KANTO CHEMICAL CO., INC.) was added dropwise until there was no precipitate. At this time, the volume ratio of the solution including the mesh structure body:iron chloride solution:ammonia water was 5:5:3.

Subsequently, in the same manner as in the freezing step, the drying step, and the carbonization step of Example 4, the obtained solution including the mesh structure body was transferred to a test tube, which was completely frozen by immersing it in liquid nitrogen for 30 minutes, and then dried and carbonized.

The mesh structure body of Comparative Example 2 obtained by the above steps was evaluated by SEM observation, EDS measurement, porosity measurement, and BET specific surface area measurement.

The particle size distribution of the alloy nanoparticles was determined by SEM observation in the same manner as in Example 1.

Figure 6F:
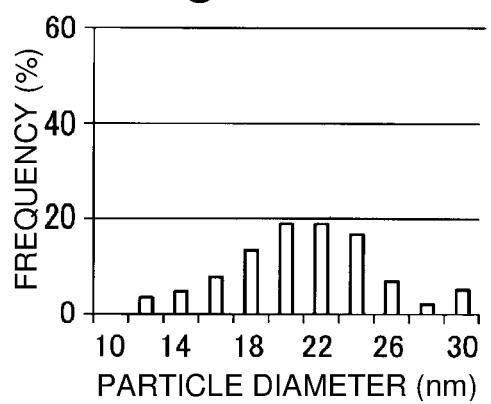
FIG. 6F shows the particle size distribution of Comparative Example 2.

FIG. 6F is the particle size distribution of Comparative Example 2, plotted with the particle diameter on the horizontal axis and the frequency on the vertical axis. It can be seen that the peak is broader even compared with Examples 1 to 5. Since aggregation cannot be prevented, the particle diameter is 15 to 25 nm. The particle diameter of Comparative Example 2 is about three times to five times larger than those of Examples 1 to 5.

When the porosity of the cellulose nanofiber was measured by the mercury press-in method, the porosity was found to be 60% or more. When the BET specific surface area was measured, it was found to be 340 $m^2/g$.

As described above, according to the present embodiment, by impregnating a mesh structure body with a solution of a protein that forms a multimer including an alloy nanoparticle of iron and copper, and then subjecting the mesh structure body impregnated with the protein solution to a heat treatment to remove the protein template, the aggregation of the nanoparticles can be suppressed and the nanoparticles can be supported in a highly dispersed manner inside the mesh structure body.

According to the present embodiment, by impregnating a sol or gel with a solution of a protein that forms alloy nanoparticles, then freezing and drying it, and removing the protein template by a heat treatment, the aggregation of nanoparticles can be more suppressed compared with the solid phase reaction. In addition, since the mesh structure body and the nanoparticles are frozen in a uniformly dispersed state, an effect of enabling the nanoparticles to be supported not only on the surface of the mesh structure body but also inside thereof can be obtained.

Note that, although Examples 1 to 5 of the present embodiment describe methods in which the nanoparticles are supported on mesh structure bodies as co-continuous bodies, the present invention is not limited to co-continuous bodies, but is equally applicable to porous bodies that can be impregnated with a protein dispersing solvent to the inside thereof.

The present invention is not limited to the embodiment described above, and it is obvious that those having ordinary skill in the art can make many modifications and combinations without departing from the technical idea of the invention.

REFERENCE SIGNS LIST

101 Protein
102 Precursor of alloy nanoparticle

The invention claimed is:

1. A method for manufacturing an alloy nanoparticle-supporting porous body, comprising the steps of:
    freezing a sol or gel in which a co-continuous body is dispersed;
    drying the frozen sol or gel in a vacuum to obtain a porous body;
    allowing the porous body to support an alloy nanoparticle-containing protein template, wherein a weight ratio of the protein template to the porous body is a weight ratio of 10% to 30%; and
    subjecting the porous body to a heat treatment to remove the protein template.

2. The method for manufacturing an alloy nanoparticle-supporting porous body according to claim 1, comprising the step of:
    allowing a bacterium to generate the sol or gel.

3. The method for manufacturing an alloy nanoparticle-supporting porous body according to claim 1, comprising the steps of:
    adding a protein template to a solution in which metal ions of iron and copper are dissolved to introduce the metal ions into the protein template;
    separating the protein template from metal ions that have not been incorporated in the protein template; and
    reducing the metal ions that have been incorporated in the protein template to obtain the alloy nanoparticle-containing protein template.

4. The method for manufacturing an alloy nanoparticle-supporting porous body according to claim 3,
    wherein the protein template is constituted with any of a ferritin protein, a heat shock protein, a DpsA protein, a capsid protein, or a modified product obtained by modifying an amino acid sequence thereof.

5. The method for manufacturing an alloy nanoparticle-supporting porous body according to claim 2, comprising the steps of:
    adding a protein template to a solution in which metal ions of iron and copper are dissolved to introduce the metal ions into the protein template;
    separating the protein template from metal ions that have not been incorporated in the protein template; and
    reducing the metal ions that have been incorporated in the protein template to obtain the alloy nanoparticle-containing protein template.

* * * * *